United States Patent [19]

Rohde et al.

[11] Patent Number: 5,611,232
[45] Date of Patent: Mar. 18, 1997

[54] METHOD AND ARRANGEMENT FOR MANUFACTURING HOT ROLLED STEEL STRIP FROM CONTINUOUSLY CAST INPUT STOCK

[75] Inventors: Wolfgang Rohde, Dormagen; Günter Kneppe, Hilchenbach, both of Germany

[73] Assignee: SMS Schloemann-Siemag Aktiengesellschaft, Düsseldorf, Germany

[21] Appl. No.: 380,098

[22] Filed: Jan. 27, 1995

[30] Foreign Application Priority Data

Jan. 27, 1994 [DE] Germany ............ 44 02 402.9

[51] Int. Cl.⁶ .............................. B21B 1/46; B21B 13/22
[52] U.S. Cl. .................... 72/202; 72/365.2; 29/527.7; 164/476
[58] Field of Search ................. 72/200, 202, 234, 72/365.2, 366.2; 29/527.7; 164/476

[56] References Cited

U.S. PATENT DOCUMENTS

| | | | |
|---|---|---|---|
| 2,139,483 | 12/1938 | Badlam | 72/202 |
| 5,058,410 | 10/1991 | Losch et al. | 72/202 |
| 5,082,047 | 1/1992 | Bricmont | 72/202 |
| 5,307,864 | 5/1994 | Arvedi et al. | 164/476 |

FOREIGN PATENT DOCUMENTS

| | | |
|---|---|---|
| 0369555 | 5/1990 | European Pat. Off. |
| 3637893 | 5/1988 | Germany. |
| 4028542 | 3/1992 | Germany. |
| 8911363 | 11/1989 | WIPO. |
| 9208557 | 5/1992 | WIPO. |

OTHER PUBLICATIONS

Patent Abstracts of Japan vol. 11 No. 74 (M–127), 11. May 1982 & JP–A–57 014413 (Nippon Steel) 25. Jan. 1982.
Patents Abstracts of Japan vol. 11 No. 180 (M–597), 10. Jun. 1987 & JP–A–62 009704 (Nippon Steel) 17. Jan. 1987.

*Primary Examiner*—Lowell A. Larson
*Assistant Examiner*—Thomas C. Schoeffler
*Attorney, Agent, or Firm*—Friedrich Kueffner

[57] ABSTRACT

A method of manufacturing hot rolled steel strip from continuously cast input stock in successive work steps includes adjusting strip-shaped input stock after solidification to hot rolling temperature and introducing the input stock into a multiple-stand rolling mill for rolling into finished strip. The rolled stock is heated by an inductive heating unit at least between the first stand and the second stand.

7 Claims, 1 Drawing Sheet

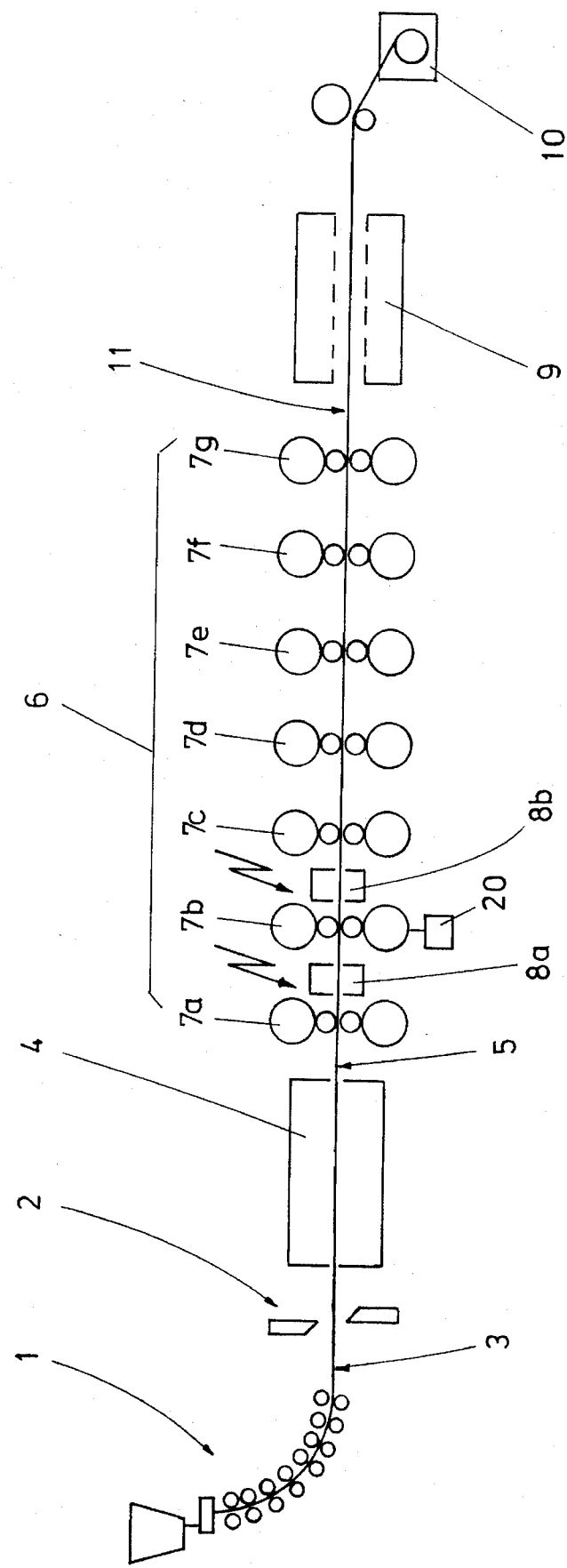

METHOD AND ARRANGEMENT FOR MANUFACTURING HOT ROLLED STEEL STRIP FROM CONTINUOUSLY CAST INPUT STOCK

BACKGROUND OF THE INVENTION

1. Field of the Invention

The present invention relates to a method of manufacturing hot rolled steel strip from continuously cast input stock in successive work steps, wherein, after solidification, strip-shaped input stock is adjusted to hot rolling temperature and the input stock is introduced into a multiple-stand rolling mill for rolling into finished strip.

2. Description of the Related Art

In accordance with a newly developed technology for the economical manufacture of hot wide strip, a so-called thin slab having a thickness of, for example, 50 mm, is produced in a continuous casting machine particularly constructed for this purpose. After solidification and temperature equalization, the thin slabs are conveyed in a roller conveyor furnace to the rolling train and are rolled to the desired final thickness.

When designing the rolling plant, it is important for economical reasons to use as few roll stands as possible. Rolling plants have already been realized which make it possible, with strip widths of up to 1350 mm for steels having low carbon contents, to achieve a final thickness of 2.5 mm by using only four roll stands. Such a plant is already known from DE 36 37 893 A1. In the known method and the arrangement for carrying out the method, the strip-shaped input stock is adjusted to rolling temperature after solidification and is introduced into a rolling mill for rolling out into finished strip, wherein rolling is carried out continuously in at most three or four roll stands with the pass reductions being as great as possible. In the first two roll stands, approximately maximum rolling moments and large work roll diameters are used.

However, more stands are required when smaller final thicknesses and greater widths of the rolled stock are to be obtained. Consequently, because of the greater length of the plant resulting from the increased temperature drop, an increase of the rolling speed must be accepted. However, because of the increased drive powers required for this purpose, this increase of the rolling speed is frequently not desirable and not even feasible. In addition, usually not more than seven stands are considered for a rolling train.

However, for example, in the case of increased material strengths, it may even be possible that a train with seven stands is not capable of achieving final thicknesses of less than 2 mm if the steel strip has a great width. The reason for this limitation of the reduction capacity is essentially the fact that the permissible reduction must be limited in the first stand because of the cast structure present in the first stand. This is a particular disadvantage because in the first stand the rolling temperature still is in the order of magnitude of 1,000° C., so that great reductions would be possible because of the low material strength. In the second stand, on the other hand, the material has already essentially recrystallized and the temperature of the rolled stock has dropped by approximately 50° C. Consequently, the possible pass reduction in the second stand is limited by the required rolling moment or the required rolling force. Even if the maximum stand capacity is utilized in the second stand and all following stands, the desired final thickness of less than 2 mm can frequently not be achieved.

SUMMARY OF THE INVENTION

Therefore, it is the primary object of the present invention to provide a method and an arrangement for the manufacture of hot rolled steel strip from continuously cast input stock which avoid the above-mentioned difficulties and technical limitations and make it possible to roll a thin slab having a thickness of approximately 50 mm into a final thickness of less than 2 mm without increasing the number of stands or the drive power.

In accordance with the present invention, the above object is met by heating the rolled stock at least between the first stand and the second stand.

The feature provided in accordance with the present invention leads to an advantageous increase of the initial pass temperature in the second stand which leads to an increase of the initial pass temperatures also in all other subsequent stands, so that greater total reduction capacities can be achieved in the second stand and in all other subsequent stands. The feature according to the present invention results in a significant increase of the total reduction capacity of the rolling mill and, thus, makes it possible to achieve the desired final thicknesses of less than 2 mm.

In accordance with a preferred feature, the rolled stock is heated by a predetermined temperature value as it passes through an induction heating unit.

In accordance with a further development, the rolled stock is heated between the first and the second stand to the same pass temperature as it has in the first stand.

In accordance with another further development, the rolled stock is heated additionally following the second stand and possibly following additional subsequent stands.

In accordance with another feature of the present invention, heating of the rolled stock between at least two stands is carried out in dependence on the desired final thickness and the given material strength and number of stands in view of the limited rolling speed, torques and/or rolling forces in the case of an insufficient reduction capacity.

Since an inductive heating unit can be switched on and off and the intensity of the heating unit can be adjusted, the method according to the present invention makes possible an extremely sensitive and controllable adjustment of the temperature of the rolled stock to optimum rolling parameters of each individual stand. As a result, the object of achieving a minimum output thickness of the rolled stock is achieved in an uncomplicated manner without increasing the number of stands and without increasing the drive power or the rolling speed.

In accordance with another feature of the invention, a synchronous operation of always two roll stands between which the rolled stock is being heated is controlled in a loop-free manner by means of a minimum pull control.

In a continuous casting plant with a subsequently arranged multiple-stand continuous rolling mill for manufacturing hot rolled steel strip from strip-shaped continuously cast input stock in successive work steps for carrying out the above-described method, wherein the strip-shaped input stock is adjusted to rolling temperature after solidification and is introduced into the rolling mill for rolling into a finished strip, the rolling mill includes an induction heating unit between the first roll stand and the second roll stand.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single figure of the drawing is a schematic side view of the arrangement according to the present invention.

DETAILED DESCRIPTION OF THE PREFERRED EMBODIMENTS

The drawing shows a continuous casting plant 1 for casting strip or strand. The continuous casting plant 1 is followed by a transverse separating unit 2, for example, a flame cutting machine or shears, for separating the cast strip 3 which leaves the continuous casting plant 1 into pieces of equal length. The individual pieces of the strip 3 are then stored in a storage and heating unit 4, for example, a roller conveyor furnace, and are adjusted to a homogenous hot rolling temperature of approximately 1,050° to 1,100° C. A piece 5 leaving the furnace 4 is descaled in the known manner and may additionally be adjusted to a new initial strip length, not shown. Subsequently, the piece 5 is finish rolled from the initial cross section to the final rolling thickness of less than 2 mm in a rolling train 6 which preferably is composed of seven stands 7a through 7g.

The rolling mill 6 has between the first roll stand 7a and the second roll stand 7b an induction heating unit 8a.

However, the present invention shall not be limited to providing an induction heating unit 8a between the first and second roll stands. Rather, in accordance with another development, it may be provided that at least one additional induction heating unit 8b is arranged following the second stand 7b and possibly following other subsequent stands 7c, etc.

Moreover, a loop-free minimum pull control 20 may preferably be provided for the roll stand 7b following the induction heating unit 8a.

The measures according to the present invention are not limited to the embodiment illustrated in the drawing. Rather, without departing from the scope of the invention, one or more induction heating units can be controlled in accordance with the drive power or rolling force of the respective roll stand. Also, the measure according to the present invention can be utilized in a rolling mill which has a different number of rolls, and in a rolling mill which has a reversing stand.

The invention is not limited by the embodiments described above which are presented as examples only but can be modified in various ways within the scope of protection defined by the appended patent claims.

We claim:

1. A method of manufacturing hot rolled steel strip from continuously cast strip-like input stock in successive work steps, the method comprising adjusting the input stock at the solidification to hot rolling temperature and introducing the input stock into a multiple-stand rolling mill for rolling into finished strip, the rolling mill including at least a first roll stand and a second roll stand and additional roll stands downstream of the second roll stand, wherein the input stock reaches the first roll stand with an initial pass temperature further comprising heating the steel strip at least between the first roll stand and the second roll stand to the initial pass temperature and heating as necessary the steel strip following one or more of the additional roll stands, and carrying out a synchronous operation of the first roll stand and the second roll stand, further comprising controlling the synchronous operation in a loop-free manner by means of a minimum pull control.

2. The method according to claim 1, comprising inductively heating the steel strip by a predetermined temperature value by passing the steel strip through an induction heating unit.

3. The method according to claim 1, comprising additionally heating the steel strip following the second roll stand.

4. The method according to claim 3, comprising carrying out heating of the steel strip in dependence on a required final thickness of the finished strip and a given material strength and number of stands so as to compensate for an insufficient reduction capacity due to at least one of limited rolling speed, torques and rolling forces.

5. The method according to claim 1, comprising carrying out heating of the steel strip in dependence on a required final thickness of the finished strip and a given material strength and number of stands so as to compensate for an insufficient reduction capacity due to at least one of limited rolling speed, torques and rolling forces.

6. A continuous casting plant with a subsequently arranged multiple-stand continuous rolling mill for manufacturing hot rolled steel strip from strip-shaped continuously cast input stock in successive work steps, wherein the strip-shaped input stock is adjusted to rolling temperature after solidification and is introduced into the rolling mill for rolling into a finished strip, the rolling mill comprising at least a first roll stand and a second roll stand, further comprising an induction heating unit for heating the steel strip between the first roll stand and the second roll stand, and an additional induction heating unit for heating the steel strip following the second roll stand, wherein the second roll stand comprising a loop-free minimum pull control.

7. The continuous casting plant according to claim 6, further comprising additional roll stands, and a further induction heating unit following at least one of the additional roll stands.

* * * * *